March 25, 1924.  1,487,787
W. C. LOEFFLER
FLEXIBLE CONNECTING CONDUIT
Filed Oct. 1, 1920

WITNESSES
J. Herbert Bradley

INVENTOR
William C. Loeffler
by Winter & Brown
his attorneys.

Patented Mar. 25, 1924.

1,487,787

UNITED STATES PATENT OFFICE.

WILLIAM C. LOEFFLER, OF PITTSBURGH, PENNSYLVANIA.

FLEXIBLE CONNECTING CONDUIT.

Application filed October 1, 1920. Serial No. 413,964.

*To all whom it may concern:*

Be it known that I, WILLIAM C. LOEFFLER, a citizen of the United States, and a resident of Pittsburgh, in the county of Allegheny and State of Pennsylvania, have invented a new and useful Improvement in Flexible Connecting Conduits, of which the following is a specification.

The invention relates to flexible connecting conduits, and has particularly to do with what are known as flexible connections for attaching a gas stove to a fixed supply conduit.

The object of the invention is to provide a flexible connecting conduit whereby a durable gas-tight connection may be effected without the use of washers or gaskets, and which is simple in construction and may be economically manufactured.

Figure 1:
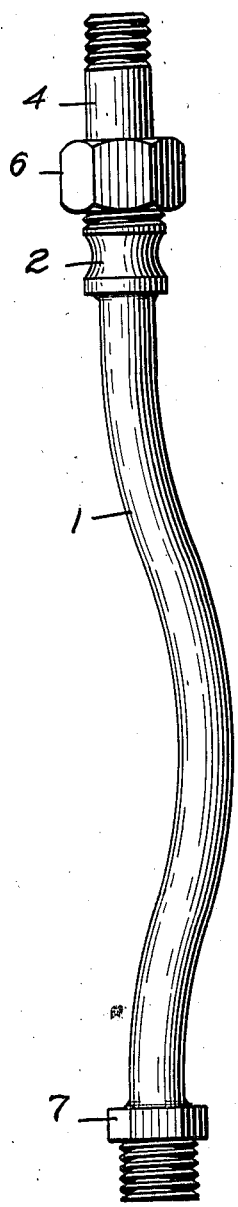
Figure 2:
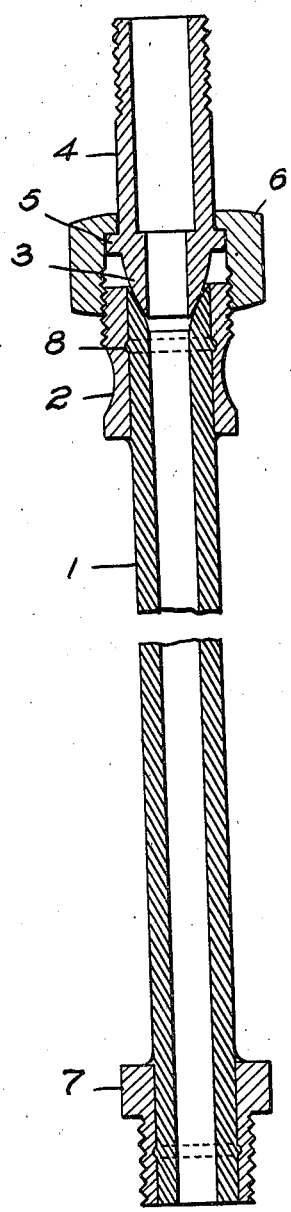

The invention is illustrated in the accompaying sheet of drawings of which Fig. 1 is a side view of a flexible connecting conduit and Fig. 2 a longitudinal central sectional view thereof.

Referring to the drawings, a soft metal pipe 1, preferably constructed of lead, extends through a brass or other hard metal sleeve 2, which is exteriorly threaded at its outer end, and which is provided interiorly with a groove 8 into which the metal of the pipe 1 is expanded for attachment of the sleeve to the pipe. The sleeve has a cylindrical bore of uniform diameter from one end to the other, and the pipe 1 terminates at the threaded end thereof. The end of pipe 1 forms a bell-shaped seat for a curved face 3 formed on the end of a hard metal tube 4, which tube may be constructed of brass. The sleeve 4 is provided with a laterally projecting flange 5 adapted to be engaged by an inwardly turned flange of a union coupling nut 6, which nut engages the exterior threads of sleeve 2. The other end of the pipe 1 may be provided with a suitable nipple 7 for making the usual form of attachment to a fixed gas pipe or other conduit.

When in use, the curved face 3 of the sleeve 4 is held by the union coupling nut 6 in firm and gas-tight contact with the end of the pipe 1, so that it is unnecessary to use the usual washers required in making the union coupling. The construction not only eliminates the expense and inconvenience of the use of washers, but the gas-tight connection does not deteriorate and leak after prolonged use. By forming the bore 2 of uniform diameter, the end of the pipe 1 does not become flared outwardly or otherwise distorted when the connection is completed, but forms a relatively narrow annular seat for the conical end 3 of the tube 4, which seat is backed by the hard metal sleeve 2.

I claim:

A flexible connecting conduit, comprising a hard metal sleeve having a cylindrical bore of uniform diameter from end to end, a soft metal flexible pipe having an end extending through and terminating with a convexly curved interior seat at an end of said sleeve, a hard metal tube provided at one end with an exterior curved face opposed to and bearing against said convexly curved seat and meeting therewith in a substantially line contact, and a union coupling nut engaging and uniting said hard metal members.

In testimony whereof, I have hereunto set my hand.

WILLIAM C. LOEFFLER.

Witness:
HOWARD L. SNIVELY